US006600897B1

(12) United States Patent
Watanabe et al.

(10) Patent No.: US 6,600,897 B1
(45) Date of Patent: Jul. 29, 2003

(54) SATELLITE-BROADCASTING RECEIVING CONVERTER WITH A PLURALITY OF OUTPUT TERMINALS

(75) Inventors: Hirokazu Watanabe, Fukushima-ken (JP); Shigetaka Suzuki, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/487,145

(22) Filed: Jan. 19, 2000

(30) Foreign Application Priority Data

Jan. 27, 1999 (JP) ........................................ 11-019126

(51) Int. Cl.[7] ........................... H04H 1/00; H04N 7/20

(52) U.S. Cl. ........................ 455/3.02; 725/71; 725/68

(58) Field of Search ............................ 455/3.02, 131, 455/132; 348/725, 731; 725/68, 69, 70, 71

(56) References Cited

U.S. PATENT DOCUMENTS 4,527,136 A * 7/1985 Kamiya .................... 333/103
4,542,300 A * 9/1985 Nagatomi .................. 307/112
4,608,710 A * 8/1986 Sugiura ...................... 725/68
4,672,687 A * 6/1987 Horton et al. .......... 455/150.1
4,761,827 A * 8/1988 Horton et al. ............... 725/69
4,802,239 A * 1/1989 Ooto ...................... 455/150.1
5,206,954 A * 4/1993 Inoue et al. ................. 725/69
5,303,403 A * 4/1994 Leong .................... 455/192.3
5,345,591 A * 9/1994 Tsurumaki et al. .......... 725/69
5,600,336 A * 2/1997 Kubo et al. ................ 343/756
5,649,312 A 7/1997 Kennan ...................... 455/333
5,940,737 A * 8/1999 Eastman ...................... 725/68
6,075,970 A * 6/2000 Van Amesfoort .......... 455/3.02
6,344,832 B1 * 2/2002 Lotfy ........................ 343/786

FOREIGN PATENT DOCUMENTS

JP 5-46147 6/1993
JP 7-50607 2/1995

* cited by examiner

*Primary Examiner*—Lee Nguyen
*Assistant Examiner*—Raymond Persino
(74) *Attorney, Agent, or Firm*—Brinks Hofer Gilson & Lione

(57) ABSTRACT

A satellite-broadcasting receiving converter includes a plurality of output terminals each of which is connected to an external receiver, to each of which a selection control voltage in which a high-frequency voltage is superposed on a DC voltage is sent from the external receiver, and from each of which one type of a receiving signal is selected according to the selection control voltage and output; and a regulator for generating a power-source voltage from the selection control voltage. Since a high-frequency attenuation unit is connected in series between each output terminal and the regulator in the satellite-broadcasting receiving converter, even if a plurality of selection control voltages are input in common to the regulator, the plurality of selection control voltages different from each other do not affect each other and thereby only one regulator is required.

4 Claims, 2 Drawing Sheets

SATELLITE-BROADCASTING RECEIVING CONVERTER WITH A PLURALITY OF OUTPUT TERMINALS

BACKGROUND OF THE INVENTION

1. Field of the Invention

The present invention relates to satellite-broadcasting receiving converters with a plurality of output terminals, connected to satellite-TV-broadcasting receivers (hereinafter just called receivers).

2. Description of the Related Art

Satellite TV broadcasting uses, for example, a frequency band ranging from 10.7 GHz to 12.75 GHz, with 10.7 GHz to 11.7 GHz for analog broadcasting and 11.7 GHz to 12.75 GHz for digital broadcasting. A horizontal-polarization wave and a vertical-polarization wave are used for both analog broadcasting and digital broadcasting. In other words, four types of satellite TV broadcasting are used in combinations of analog broadcasting and digital broadcasting, and a horizontal-polarization wave and a vertical-polarization wave.

Satellite-broadcasting receiving converters receive satellite TV broadcasting signals sent from broadcasting satellites and convert a received frequency to a lower frequency.

When a satellite-broadcasting receiving antenna (not shown) receives a signal, the signal is divided into a horizontal-polarization wave and a vertical-polarization wave by a waveguide (not shown) and input to a satellite-broadcasting receiving converter.

FIG. 2 shows a conventional satellite-broadcasting receiving converter. The conventional satellite-broadcasting receiving converter includes a received-signal amplifier circuit section 51 for separately amplifying a horizontal-polarization wave and a vertical-polarization wave, a demultiplexer circuit section 52 for demultiplexing each amplified received signal into two signals with a boundary frequency of 11.7 GHz, a filter section 53 for attenuating the image signal of each demultiplexed received signal, a frequency-conversion section 54 for converting the frequency of each received signal output from the filter section 53, an amplifier circuit section 55 for amplifying each frequency-converted received signal, signal selection means 56 for selecting a received signal of one type from the received signals output from the amplifier circuit section 55, and two regulators 57 and 58 for supplying power-source voltages to the received-signal amplifier circuit section 51 to the signal selection means 56.

The received-signal amplifier circuit section 51 has two amplifiers 59 and 60. The horizontal-polarization wave is input to the amplifier 59 through an input end 51*a* and is amplified, and the vertical-polarization wave is input to the amplifier 60 through an input end 51*b* and is amplified.

The demultiplexer circuit section 52 has two demultiplexers 61 and 62, and demultiplexes the polarized waves amplified by the received-signal amplifier circuit section 51 into analog received signals A1 and A2 having a frequency of 11.7 GHz or less and digital received signals D1 and D2 having a frequency of 11.7 GHz or more. With this demultiplexing, the received signals are demultiplexed into the four received signals and output from the demultiplexer circuit section 52.

The filter section 53 has four band-elimination filters (BEFs) 63 to 66. The received signals A1, A2, D1, and D2 output from the demultiplexer circuit section 52 are input to the BEFs 63 to 66, respectively.

Among these BEFs, the BEFs 63 and 64 attenuate signals having frequencies of 7.8 GHz to 8.8 GHz, which correspond to the frequency band of the image signals of the analog received signals A1 and A2, and the BEFs 65 and 66 attenuate signals having frequencies of 8.45 GHz to 9.5 GHz, which correspond to the frequency band of the image signals of the digital received signals D1 and D2.

The received signals whose image signals are attenuated by the BEFs 63 to 66 are input to the frequency converter section 54.

The frequency converter section 54 has four mixers 67 to 70 and two oscillators 71 and 72. The received signals A1, A2, D1, and D2 are input to the mixers 67 to 70 provided correspondingly to the BEFs 63 to 66, respectively.

The oscillator 71 inputs an oscillation signal having a frequency of 9.75 GHz into the mixers 67 and 68, and the oscillator 72 inputs an oscillation signal having a frequency of 10.6 GHz into the mixers 69 and 70. The frequencies of the analog received signals A1 and A2 input into the mixers 67 and 68 are converted to those in a range from 950 MHz to 1950 MHz, and the frequencies of the digital received signals D1 and D2 input into the mixers 69 and 70 are converted to those in a range from 1100 MHz to 2150 MHz. The frequency-converted received signals a1, a2, d1, and d2 are input to the amplifier circuit section 55.

The amplifier circuit section 55 has four amplifiers 73 to 76. The frequency-converted received signals a1, a2, d1, and d2 are input to the amplifiers 73 to 76 provided correspondingly to the mixers 67 to 70, respectively. The received signals amplified by the amplifiers 73 to 76 are input to the signal selection means 56.

The signal selection means 56 has a signal switching circuit 77, two switching control circuits 78 and 79, and two output terminals 56*a* and 56*b*. The signal switching circuit 77 selects one of the outputs of the amplifiers 73 to 76 according to the control of the switching control circuit 78 and connects it to one terminal 56*a*, and selects one of the outputs of the amplifiers 73 to 76 according to the control of the switching control circuit 79 and connects it to the other output terminal 56*b*.

The output terminals 56*a* and 56*b* are connected to different receivers (not shown). Each receiver sends a selection control voltage used for operating each circuit section of the satellite-broadcasting receiving converter and for controlling the signal selection means 56. This selection control voltage is set to a first DC voltage of, for example, 18 V to select a horizontal-polarization wave, and is set to a second DC voltage of, for example, 14 V to select a vertical-polarization wave. To select a digital received signal d1 or d2, a 22-kHz high-frequency voltage is superposed on the corresponding DC voltage.

More specifically, to select the horizontal-polarization analog broadcasting signal a1, the first DC voltage is sent; to select the vertical-polarization analog broadcasting signal a2, the second DC voltage is sent; to select the horizontal-polarization digital broadcasting signal d1, the first DC voltage on which the high-frequency voltage is superposed is sent; and to select the vertical-polarization digital broadcasting signal d2, the second DC voltage on which the high-frequency voltage is superposed is sent to the corresponding output terminal 56*a* or 56*b* as a selection control signal.

A selection control voltage sent to the output terminal 56*a* is input to the switching control circuit 78 and the regulator 57 through a high-frequency choke coil 80. In the same way, a selection control voltage sent to the output terminal 56*b* is input to the switching control circuit 79 and the regulator 58 through a high-frequency choke coil 81.

The regulators 57 and 58 supply a power-source voltage of, for example, 8 V to the circuit sections 51 to 56. These two regulators 57 and 58 have the same structure and each have a voltage stabilizer circuit formed of an integrated circuit. The output ends of the regulators 57 and 58 are connected to a power-source-voltage output terminal 84 through reverse-current-prevention diodes 82 and 83, respectively. Therefore, even if one receiver is stopped, this satellite-broadcasting receiving converter is ready to operate since the power-source voltage is supplied to the circuit sections 51 to 56. Since the two regulators 57 and 58 are connected in series between the two output terminals **56*a* and 56*b*, the switching control circuits 78 and 79 operate only by the switching control voltage sent from one of the output terminals 56*a* and 56*b***.

As described above, since the conventional satellite-broadcasting receiving converter is provided with the two regulators 57 and 58 so as to be ready to operate even if one of two receivers connected to the two output terminals **56*a* and 56*b*** is stopped, the converter is expensive.

SUMMARY OF THE INVENTION

Accordingly, it is an object of the present invention to provide an inexpensive satellite-broadcasting receiving converter.

The foregoing object is achieved according to the present invention through the provision of a satellite-broadcasting receiving converter including a plurality of output terminals each of which can be connected to an external receiver, to each of which any one of four types of selection control voltages specified according to the combinations of high and low DC voltages and whether a high-frequency voltage having a predetermined frequency is superposed is separately sent from the external receiver, and from each of which a satellite-broadcasting receiving signal of a type selected according to the selection control voltage is separately output to the external receiver; signal selection means for selecting one type of a receiving signal according to the selection control voltage from four types of satellite-broadcasting receiving signals different in modulation-signal form and polarization direction from each other for each output terminal to output it; a regulator for receiving the selection control voltage sent from each output terminal in common and for converting the selection control voltage to a predetermined power-source voltage to output it; and a plurality of high-frequency attenuation means each connected in series between each output terminal and an input end of the regulator.

Since each of the high-frequency attenuation means is connected in series between each output terminal and the input end of the regulator, the selection control voltage sent to each output terminal reaches the input end of the regulator with its superposed high-frequency voltage being sufficiently attenuated by the high-frequency attenuation means. The selection control voltage does not flow reversely into other output terminals from the input end of the regulator. A type of a receiving signal is separately selected and output to each output terminal. Therefore, only one regulator is required for a plurality of types of selection control voltages sent from a plurality of output terminals.

The satellite-broadcasting receiving converter may be configured such that each of the plurality of high-frequency attenuation means includes a transistor and a low-pass filter having a cutoff frequency lower than the frequency of the high-frequency voltage.

In this case, the high-frequency voltage is attenuated by a simple circuit.

The satellite-broadcasting receiving converter may be configured such that the low-pass filter is formed of a resistor and a capacitor which determine the cutoff frequency; and the selection control voltage is input to the collector of the transistor, the resistor is connected between the collector and the base, the base is grounded through the capacitor, and the emitter is connected to the input end of the regulator.

In this case, a ripple-voltage attenuation effect is great and the signal selection means is positively operated with its erroneous operation being prevented.

Alternatively, the satellite-broadcasting receiving converter may be configured such that a high-frequency choke coil and a reverse-current-prevention diode are connected to each other in series between the output terminal and the collector of the transistor.

In this case, even if a high reverse voltage is applied to the high-frequency attenuation means, the transistor is not destroyed by the reverse voltage.

DESCRIPTION OF THE PREFERRED EMBODIMENT

Figure 1:
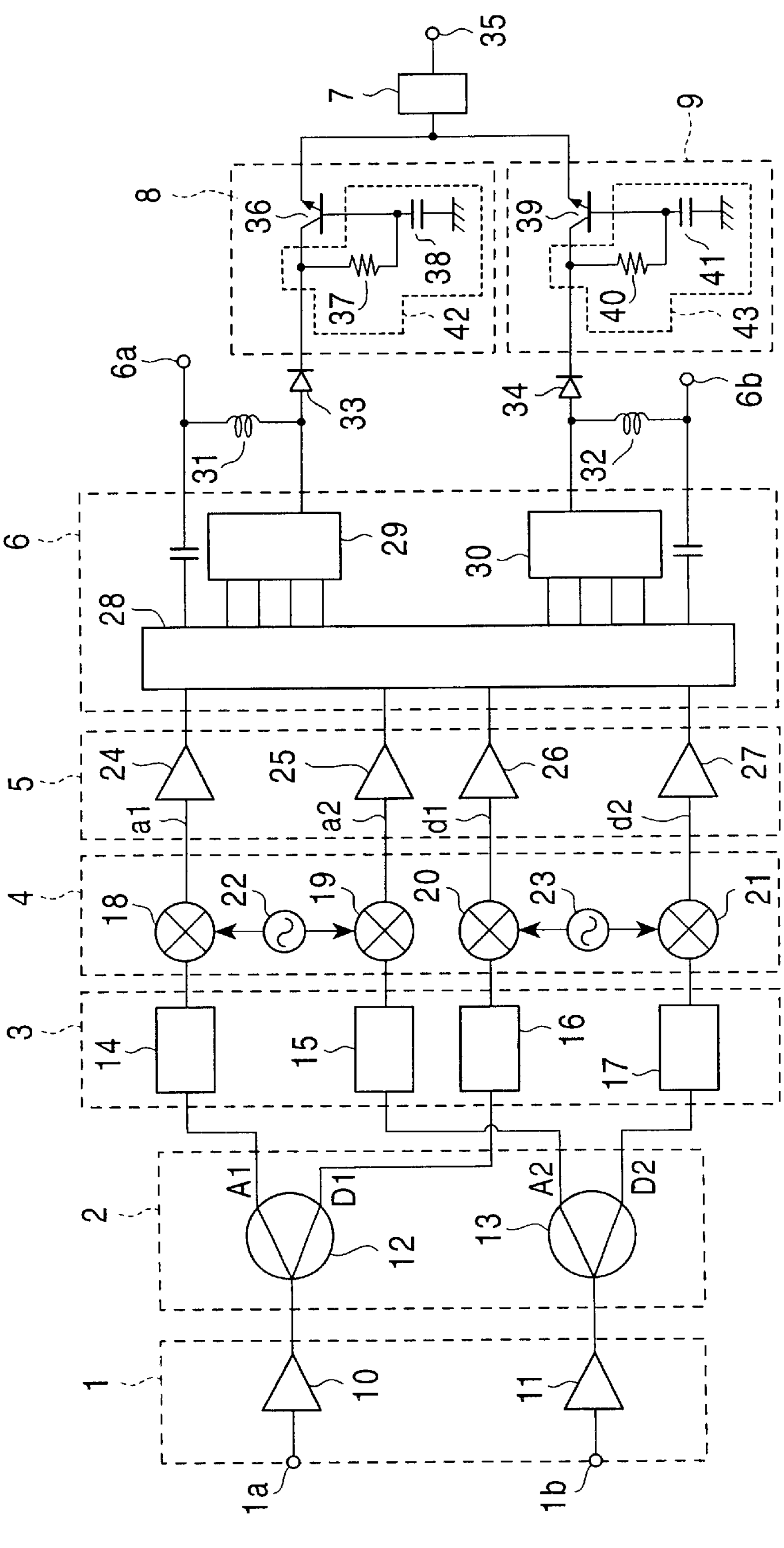
FIG. 1 is a circuit diagram of a satellite-broadcasting receiving converter according to an embodiment of the present invention.
Figure 2:
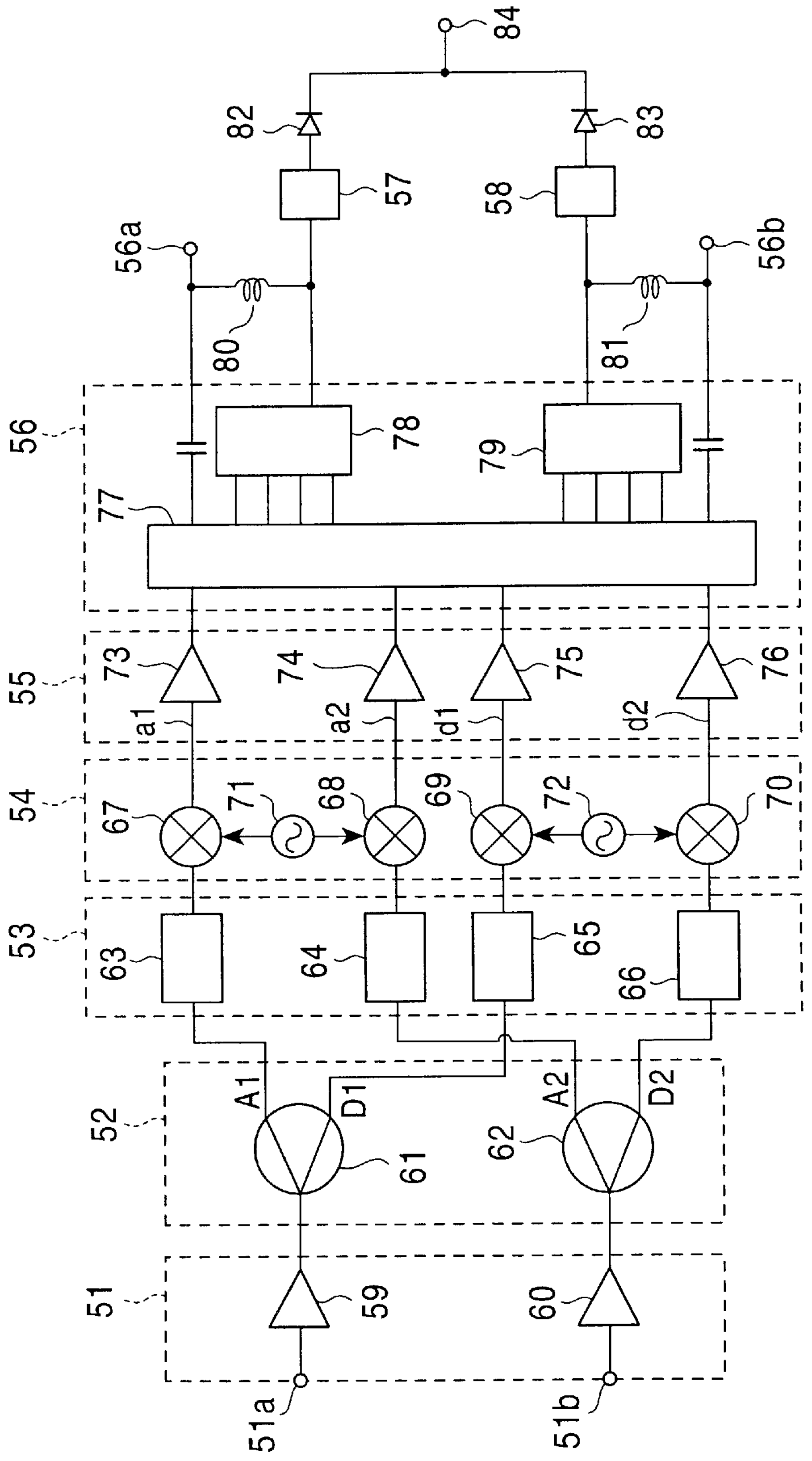
FIG. 2 PRIOR ART
FIG. 2 is a circuit diagram of a conventional satellite-broadcasting receiving converter.

A satellite-broadcasting receiving converter according to an embodiment of the present invention will be described below by referring to FIG. 1. The satellite-broadcasting receiving converter includes a received-signal amplifier circuit section 1 for separately amplifying a horizontal-polarization wave and a vertical-polarization wave, a demultiplexer circuit section 2 for demultiplexing each amplified received signal into two signals with a boundary frequency of 11.7 GHz, a filter section 3 for attenuating the image signal of each demultiplexed received signal, a frequency-conversion section 4 for converting the frequency of each received signal output from the filter section 3, an amplifier circuit section 5 for amplifying each frequency-converted received signal, signal selection means 6 for selecting a received signal of one type from the received signals output from the amplifier circuit section 5, a regulator 7 for supplying a power-source voltage to the received-signal amplifier circuit section 1 to the signal selection means 6, and two high-frequency attenuating means 8 and 9.

The received-signal amplifier circuit section 1 has two amplifiers 10 and 11. The horizontal-polarization wave is input to the amplifier 10 through an input end la and is amplified, and the vertical-polarization wave is input to the amplifier 11 through an input end lb and is amplified.

The demultiplexer circuit section 2 has two demultiplexers 12 and 13, and demultiplexes the polarized waves amplified by the received-signal amplifier circuit section 1 into analog received signals A1 and A2 having a frequency of 11.7 GHz or less and digital received signals D1 and D2 having a frequency of 11.7 GHz or more. With this demultiplexing, the received signals are demultiplexed into the four received signals and output from the demultiplexer circuit section 2.

The filter section 3 has four band-elimination filters (BEFs) 14 to 17. The received signals A1, A2, D1, and D2 output from the demultiplexer circuit section 2 are input to the BEFs 14 to 17, respectively.

Among these BEFs, the BEFs 14 and 15 attenuate signals having frequencies of 7.8 GHz to 8.8 GHz, which correspond to the frequency band of the image signals of the analog received signals A1 and A2, and the BEFs 16 and 17 attenuate signals having frequencies of 8.45 GHz to 9.5 GHz, which correspond to the frequency band of the image signals of the digital received signals D1 and D2.

The received signals whose image signals are attenuated by the BEFs 14 to 17 are input to the frequency converter section 4.

The frequency converter section 4 has four mixers 18 to 21 and two oscillators 22 and 23. The received signals A1, A2, D1, and D2 are input to the mixers 18 to 21 provided correspondingly to the BEFs 14 to 17, respectively.

The oscillator 22 inputs an oscillation signal having a frequency of 9.75 GHz into the mixers 18 and 19, and the oscillator 23 inputs an oscillation signal having a frequency of 10.6 GHz into the mixers 20 and 21. The frequencies of the analog received signals A1 and A2 input into the mixers 18 and 19 are converted to those in a range from 950 MHz to 1950 MHz, and the frequencies of the digital received signals D1 and D2 input into the mixers 20 and 21 are converted to those in a range from 1100 MHz to 2150 MHz. The frequency-converted received signals a1, a2, d1, and d2 are input to the amplifier circuit section 5.

The amplifier circuit section 5 has four amplifiers 24 to 27. The frequency-converted received signals a1, a2, d1, and d2 are input to the amplifiers 24 to 27 provided correspondingly to the mixers 18 to 21, respectively. The received signals amplified by the amplifiers 24 to 27 are input to the signal selection means 6.

The signal selection means 6 has a signal switching circuit 28, two switching control circuits 29 and 30, and two output terminals 6*a* and 6*b*. The signal switching circuit 28 selects one of the outputs of the amplifiers 24 to 27 according to the control of the switching control circuit 29 and connects it to one terminal 6*a*, and selects one of the outputs of the amplifiers 24 to 27 according to the control of the switching control circuit 30 and connects it to the other output terminal 6*b*.

The output terminals 6*a* and 6*b* are connected to different receivers (not shown). Each receiver sends a selection control voltage used for operating each circuit section of the satellite-broadcasting receiving converter and for controlling the signal selection means 6. This selection control voltage is set to a first DC voltage of, for example, 18 V to select a horizontal-polarization wave, and is set to a second DC voltage of, for example, 14 V to select a vertical-polarization wave. To select a digital received signal d1 or d2, a 22-kHz high-frequency voltage is superposed on the corresponding DC voltage.

More specifically, to select the horizontal-polarization analog received signal a1, the first DC voltage is sent; to select the vertical-polarization analog received signal a2, the second DC voltage is sent; to select the horizontal-polarization digital received signal d1, the first DC voltage on which the high-frequency voltage is superposed is sent; and to select the vertical-polarization digital broadcasting signal d2, the second DC voltage on which the high-frequency voltage is superposed is sent to the corresponding output terminal 6*a* or 6*b* as a selection control signal.

A selection control voltage sent to the output terminal 6*a* is input to the switching control circuit 29 through a high-frequency choke coil 31 and to the high-frequency attenuation means 8 through a reverse-current-prevention diode 33. In the same way, a selection control voltage sent to the output terminal 6*b* is input to the switching control circuit 30 through a high-frequency choke coil 32 and to the high-frequency attenuation means 9 through a reverse-current-prevention diode 34.

The high-frequency attenuation means 8 includes a transistor 36 and a low-pass filter 42 formed of a resistor 37 connected between the collector and the base of the transistor 36 and a capacitor 38 connected between the base of the transistor 36 and the ground. The collector of the transistor 36, serving as an input end of the high-frequency attenuation means 8, is connected to the cathode of the diode 33, and the emitter of the transistor 36, serving as an output end of the high-frequency attenuation means 8, is connected to an input end of the regulator 7. The high-frequency attenuation means 9 has the same structure as the high-frequency attenuation means 8. The high-frequency attenuation means 9 includes a transistor 39 and a low-pass filter 43 formed of a resistor 40 and a capacitor 41. The collector of the transistor 39 is connected to the cathode of the diode 34, and the emitter of the transistor 39 is connected to the input end of the regulator 7.

The cutoff frequency of the low-pass filter 42 is specified by the resistor 37 and the capacitor 38. The cutoff frequency of the low-pass filter 43 is specified by the resistor 40 and the capacitor 41. Both cutoff frequencies are set so as to be lower than the frequency of the high-frequency voltage included in a selection control voltage.

Since the cutoff frequencies of the low-pass filters 42 and 43 are set so as to be lower than the frequency of the high-frequency voltage as described above, a selection control voltage input to one output terminal 6*a* is sent to the input end of the regulator 7 with the superposed high-frequency voltage being attenuated to a level which practically has no problem by the high-frequency choke coil 31 and the high-frequency attenuation means 8, and is blocked by the other high-frequency attenuation means 9 and thereby is not input to the other switching control circuit 30. Since the high-frequency attenuation means 8 and 9 are formed of combinations of the transistors 36 and 39 and the low-pass filters 42 and 43, even if the capacitances of the capacitors 38 and 41 in the low-pass filters 42 and 43 are low, a high ripple attenuation effect is obtained.

The regulator 7 has a voltage stabilizer circuit formed of an integrated circuit. Selection control voltages input to both output terminals 6*a* and 6*b* are input into the regulator 7 in common through the high-frequency attenuation means 8 and 9. In other words, when at least one receiver is operating, a DC voltage of 18 V or 14 V is input to the regulator 7, and the regulator 7 converts the input DC voltage, for example, to a DC voltage of 8V, outputs it from a power-source-voltage output terminal 35, and sends it as a power-source voltage to the circuit sections 1 to 6 of the satellite-broadcasting receiving converter.

In the above embodiment, the satellite-broadcasting receiving converter is provided with a plurality of output terminals, namely, the two output terminals 6*a* and 6*b*. A satellite-broadcasting receiving converter according to the present invention may be provided with three or more output terminals. The attenuation means 8 and 9 are formed of the transistors and the low-pass filters in the above embodiment. Each attenuation means may include an LC low-pass filter formed of an inductor and a capacitor. In this case, the same advantage is obtained.

What is claimed is:

1. A satellite-broadcasting receiving converter comprising:

a plurality of output terminals each of which can be connected to an external receiver, to each of which any one of four types of selection control voltages specified according to the combinations of high and low DC voltages and whether a high-frequency voltage having a predetermined frequency is superposed is separately sent from the external receiver, and from each of which a satellite-broadcasting receiving signal of a type selected according to the selection control voltage is separately output to the external receiver;

signal selection means for selecting one type of a receiving signal according to the selection control voltage from four types of satellite-broadcasting receiving signals different in modulation-signal form and polarization direction from each other for each output terminal to output it;

a regulator for receiving the selection control voltage sent from each output terminal in common and for converting the selection control voltage to a predetermined power-source voltage to output it; and a plurality of high-frequency attenuation means each connected in series between each output terminal and an input end of said regulator.

2. A satellite-broadcasting receiving converter according to claim 1, wherein each of said plurality of high-frequency attenuation means comprises a transistor and a low-pass filter having a cutoff frequency lower than the frequency of the high-frequency voltage.

3. A satellite-broadcasting receiving converter according to claim 2, wherein the low-pass filter is formed of a resistor and a capacitor which determine the cutoff frequency; and the selection control voltage is input to the collector of the transistor, the resistor is connected between the collector and the base, the base is grounded through the capacitor, and the emitter is connected to the input end of the regulator.

4. A satellite-broadcasting receiving converter according to claim 2, wherein a high-frequency choke coil and a reverse-current-prevention diode are connected to each other in series between the output terminal and the collector of the transistor.

* * * * *